United States Patent [19]

Giers et al.

[11] 4,064,761

[45] Dec. 27, 1977

[54] METHOD AND APPARATUS FOR ASCERTAINING AND INDICATING THE ANGULAR POSITION OF AN UNBALANCE IN A ROTOR

[75] Inventors: Alfred Giers, Rossdorf; Paul Holdinghausen, Bickenbach; Hatto Schneider, Heppenheim-Kirschhausen; Friedhelm Widmann, Seeheim, all of Germany

[73] Assignee: Firma Carl Schenck AG, Darmstadt, Germany

[21] Appl. No.: 736,372

[22] Filed: Oct. 28, 1976

[30] Foreign Application Priority Data

Oct. 31, 1975 Germany .................. 2548729

[51] Int. Cl.² .................. G01M 1/22; G01M 1/08
[52] U.S. Cl. .................. 73/462
[58] Field of Search .................. 73/462, 464, 466, 457

[56] References Cited

U.S. PATENT DOCUMENTS

| | | | |
|---|---|---|---|
| 2,754,686 | 7/1956 | Phelps | 73/466 X |
| 3,184,976 | 5/1965 | Greiner | 73/462 |
| 3,678,761 | 7/1972 | Blackburn | 73/464 |
| 3,732,737 | 5/1973 | Forster | 73/462 |

Primary Examiner—James J. Gill
Attorney, Agent, or Firm—W. G. Fasse; W. W. Roberts

[57] ABSTRACT

The unbalance angle is transformed into units of length or into non-dimensional units which are correlated to the body to be balanced, either to a circumference thereof, or to a characteristic scale of the body to be balanced. The unbalance position may then be displayed in such units. The apparatus for performing the method includes a transformation computer which transforms the measured angular value through at least one operant. Preferably, the apparatus also includes an indicator device for units of length or for non-dimensional units or angle representing units.

19 Claims, 6 Drawing Figures

METHOD AND APPARATUS FOR ASCERTAINING AND INDICATING THE ANGULAR POSITION OF AN UNBALANCE IN A ROTOR

BACKGROUND OF THE INVENTION

The present invention relates to a method and apparatus for ascertaining and indicating the angular position of an unbalance in a rotor, especially for a balancing machine provided with an angular indicator. The invention is especially useful in machines wherein the body to be balanced is rotated by means other than a universal joint shaft, for example, where the rotor to be balanced is driven by belt means or the like.

There are various methods known for ascertaining the angular position of an unbalance and for indicating such an unbalance in balancing machines. For example, it is known to separate the unbalance into two components which are then displayed in a rectangular coordinate system or in an oblique coordinate system. The two components define the angular position of the unbalance in an unequivocal manner. It is also known to display or indicate the unbalance in a polarcoordinate system whereby again an unequivocal angular indication of the unbalance is assured. It is further known to indicate in addition to the size of the unbalance, also the angular position of the unbalance on a further display device, and relative to a fixed reference or null point. In balancing machines in which the unbalance angle is ascertained by stroboscopic means a scale tape is secured to the body to be balanced or a scale disc rotates in synchronism with the body to be balanced, said disc being provided with an angular graduation or scale which is exposed to light flashes as it rotates in order to display the angular location of the unbalance. After the angular position of the unbalance has been ascertained and displayed on a respective indicator it is necessary to transfer the unbalance position back onto the body to be balanced. Stated differently, the body to be balanced must be marked exactly at the location of the unbalance so that a machining or the like may be performed at such location. Such transfer or marking of the body to be balanced is especially easy where the body is provided with a graduated tape around its circumference or where a graduated scale is provided in the balancing machine which scale rotates in synchronism with the body to be balanced. This is, for example, the case in balancing machines in which the body to be balanced is driven by a universal joint shaft. The graduated scale may even be attached directly to the body to be balanced or a marking representing the scale may be part of the body to be balanced. However, with these prior art devvices it is disadvantageous that the members rotating with the body, such as the universal joint shaft driving the body, or a sensing disc secured to the body may influence the accuracy of the balancing. Besides, additional sensing discs are unwieldy or it is necessary to adapt them individually to each type of body to be balanced. In those devices where the unbalance is displayed directly on the body to be balanced by stroboscopic means, it must be taken into account that the angular indication cannot be stored.

OBJECTS OF THE INVENTION

In view of the above, it is the aim of the invention to achieve the following objects, singly or in combination:

to overcome the above mentioned disadvantages of the prior art, more specifically, to provide a method for ascertaining and indicating the angular position of an unbalance, especially in a balancing machine provided with an angular indicator, whereby the accuracy of the balancing must not be affected by the ascertaining and display of the angular position of the unbalance;

to provide for the storing of the angular position and to transfer the angular position of the unbalance onto the body to be balanced, especially in machines in which the body to be balanced is driven by means other than a universal joint shaft;

to provide a method which may be employed for the purpose of displaying and transferring the angular position of the unbalance regardless whether such position is to be marked directly on the body to be balanced or on a machine member which rotates with the body to be balanced;

to provide a method for ascertaining and indicating the angular position of an unbalance regardless of the type of the body to be balanced and regardless of the size of such bodies; and to provide a method and apparatus for the ascertaining and indicating of the angular position of an unbalance which is universally useful, for example, in connection with a conventional angular display as well as for display of length units distributed around the circumference of the body to be balanced or for display in non-dimensional units, whereby even selector switch means may be provided for selecting any one of a number of display types.

SUMMARY OF THE INVENTION

According to the invention there is provided a method for ascertaining and indicating the angular position of an unbalance in a balancing machine including an angular indicator, wherein the ascertained unbalanced angle is transformed and/or indicated in units of length or in non-dimensional units which are correlated to the respective circumference or to a characteristic graduation of the body to be balanced, and which encompass a range of 360°.

It is an advantage of the foregoing method that it provides a precise and rapid manner for ascertaining and indicating the angular position of an unbalance which is universally applicable, and which is especially useful in balancing machines in which the body to be balanced is rotated by means other than a universal joint drive shaft. In addition, the present method provides the possibility of storing the angular position or indication so that the angular value is available for the subsequent balancing operation. A special advantage of the invention is seen in that the indicated angle is easily transferred onto the body to be balanced, for example, in the form of a length to be measured along the circumference of the body to be balanced or in the form of a characteristic graduation on the body to be balanced, which graduation may be simply counted. The invention is also suitable for simply placing markings on the body to be balanced, which markings are then counted from a null position to the position of the unbalance.

The apparatus for performing the present method, specifically for ascertaining and indicating the angular position of an unbalance, is characterized by means for transforming the measured angular values by at least one operant and/or by an indicating device for units of length and/or non-dimensional units. More specifically, according to the invention, means are provided for multiplying the measured angular value with a radius of the body to be balanced. Preferrably, the apparatus of the invention is also provided with a preselector means for selecting the indicator range, for example, the excursion of a pointer in an angular range of 0° to 360°. This has the advantage that the angular display is easily adjusted relative to bodies to be balanced having different structures and sizes. In this connection it may be advantageous to provide the preselector device of the angular indicator range with an attenuator.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
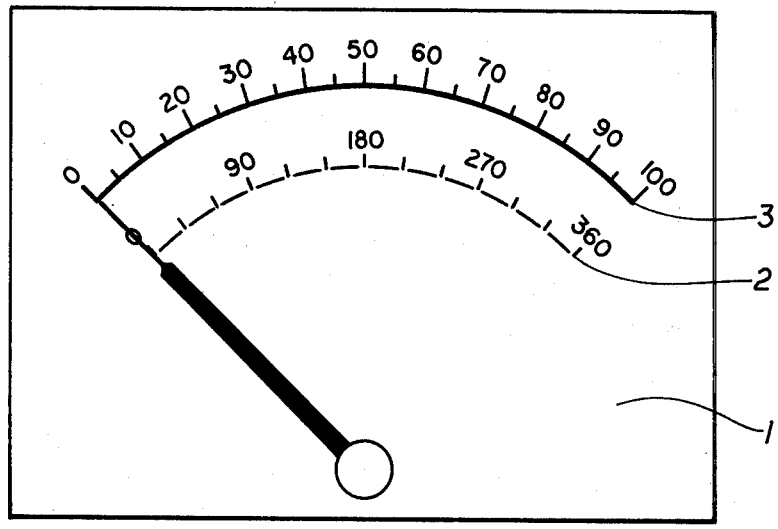
FIG. 1 is an angular indicator device of a balancing machine with a scale graduation, according to the invention.

FIG. 1 shows a simple example embodiment for performing the method according to the invention, namely, displaying angular values on an indicator device 1, which as such is well known in the art. One scale 2 is provided with a graduation from 0° to 360° scale marks, for example, corresponding to 360°. Another scale 3 is provided with a graduation from 0 to 100, for example, providing a non-dimensional display. Such devices are well known and suitable for the display in several balancing planes. The devices are also provided with switch over means so that the display may be made in any desired balancing plane. The unbalance angle is determined on the balancing machine by means of well known measuring devices, which are not part of the present invention. For example, the unbalance representing angular value may be provided in the form of an analog voltage value which is supplied to the indicator 1 through circuits as disclosed herein.

Figure 5:
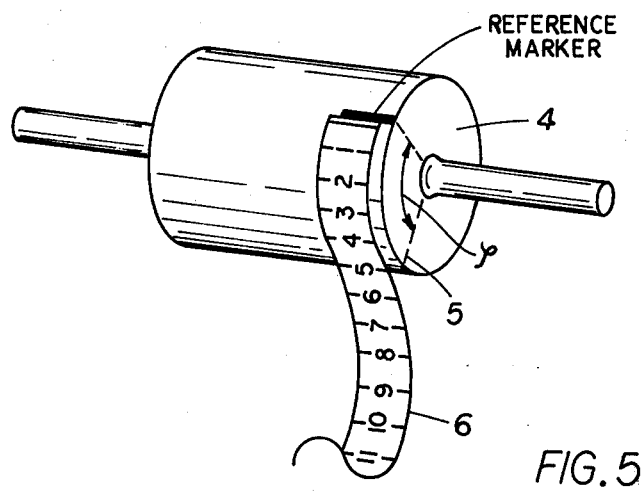
FIG. 5 illustrates the measuring of a length around the circumference of a body to be balanced.

Other graduations on the face of the indicator 1 may comprise a double scale each having a graduation from 0° to 180°, whereby the null point is in the middle of the scale and a pointer would travel to the right or left from the null point. Two different types of scales are shown in FIG. 1. The zero or null point as marked on the scale corresponds to a respective reference marker on the body 4 to be balanced as shown in FIG. 5. The unbalance 5 may, for example, be located as shown in FIG. 5 and the angle between the reference marker and the unbalance is to be ascertained and displayed as the unbalance angle $\phi$.

The transfer of the actual position of the unbalance 5 onto the body 4 is easy where the body to be balanced is driven by a universal joint shaft, because in that case there is a form locking between the rotating members of the balancing machine and the body to be balanced. The balancing machine itself is provided with an angular scale and it is then easy to mark the position 5 in accordance with such scale in order to know where the balancing operation, such as material removal, must take place. Such transfer is not as simple, in those instances where there is no form locking between the drive means and the body to be balanced, as will be explained in more detail below.

As mentioned above, the graduation or scale 3 represents a non-dimensional display in a range from 0 to 100. Other ranges may be provided and the display range may be selectable by respective switch means as is well known in the art. However, in all types of display it is necessary that the selected scale division or graduation can be related to the body to be balanced and that the respective range is capable to encompass 360° in order to ascertain any unbalance angle on the body to be balanced. Further, in all instances, the null point of the scale is correlated to the reference marker on the body to be balanced. Incidentally, with regard to the graduation or scale division 3 it will be noted that one scale division corresponds to 3.6° and the scale division 100 corresponds to 360°.

The new scale division is especially advantageous where it is possible to provide the body to be balanced with a suitable angular marking, for example, already when manufacturing the respective body, such as rotors for electrical motors and the like. Such markings could be provided in the form of a consecutive numbering over the circumference of the body or it may be applied to the facing surface. In its simplest form the markings on the body 4 may be provided by gluing an adhesive tape 6, provided with a respective graduation to the circumference of the body 4, whereby the beginning of the tape 6 would coincide with the reference marker on the body 4, as shown in FIG. 5.

If the type of the body to be balanced changes, for example, where rotors of different sizes must be balanced, it is possible to exchange the scale face of the angular indicator 1 and replace the scale face by another scale face adapted to the particular body to be balanced. Similarily, fixed scale faces may be employed where the particular balancing machine is intended for balancing large numbers of the same type of rotor. Besides, the invention facilitates it greatly to use different graduations or scales on the same display device, whereby a simple selector switch may be provided for selecting the particular graduation or scale suitable for a particular type of rotor.

Yet another advantage of the invention is seen in that by correlating exactly the graduation on the indicator 1 to the circumference length of a body to be balanced, the marking on the body may simply be accomplished as shown in FIG. 5 by counting a respective number along the tape 6.

Figure 2:
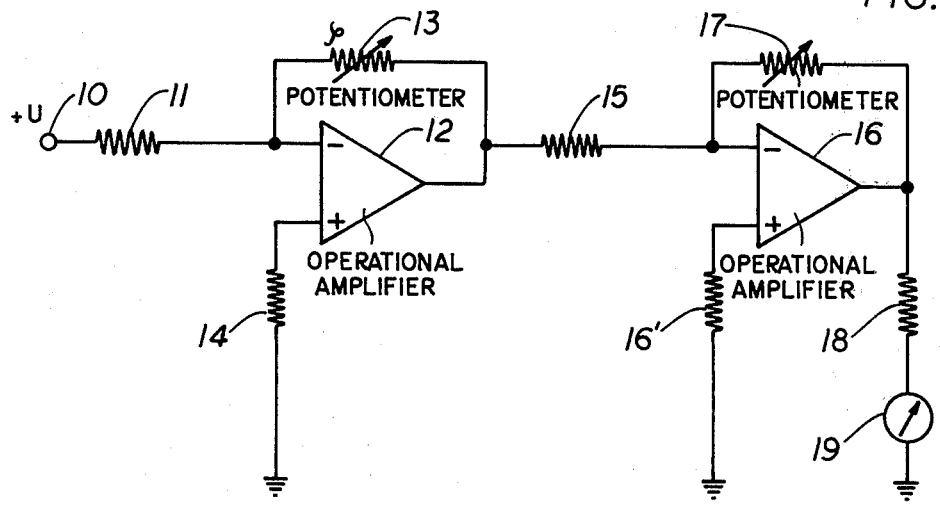
FIG. 2 is a block diagram of a circuit arrangement for the angular display involving an analog angle conversion and an analog display.

FIG. 2 illustrates a circuit which facilitates the adaptation of the display device to different types of bodies to be balanced, for example, rotors having different sizes and different graduations on their surface and the like.

Referring further to FIG. 2 a constant voltage $+ U$ is supplied to the input terminal 10 leading to an operational amplifier 12 through a series resistor 11. An adjustable resistor 13 provides a feedback from the output of the operational amplifier 12 to its input, whereby the input of voltage to the operational amplifier is proportional to the unbalance angle $\phi$. The unbalance angle is ascertained by the measuring means of a balancing machine in a known manner. In other words, the resistor 13 is adjusted in accordance with a reading provided by the measuring device of the balancing machine not shown. For this purpose, the adjustable resistor 13 may be provided with a respective scale. The other input of the operational amplifier 12 is connected to grounds by a resistor 14.

Further, the output of the operational amplifier 12 is connected to an additional operational amplifier 16 through a resistor 15. The second operational amplifier 16 is also connected in parallel to an adjustable resistor 17 by means of which it is possible to adjust the circumference of the body to be balanced relative to any desired scale or relative to a measuring tape glued to the circumference of the body to be balanced. The adjustment of the potentiometer 17 will then correspond to the respective maximum number on the tape. If desired, the potentiometer 17 may also be adjusted relative to the radius or relative to the diameter of the body to be balanced and the potentiometer 17 may be provided with their respective scale. The other input of the operational amplifier 16 is also grounded through a resistor 16' and the output voltage of the operational amplifier 16 is supplied through a resistor 18 to an analog indicating device 19 having a scale or graduation corresponding to the selected circumferential units or the like. Thus, by the dimensioning of the circuit of FIG. 2 it is possible to read the unbalance angle $\phi$ directly off the indicator 19. The display may be in units of length correlated to the circumference or it may be displayed as a non-dimensional number.

For practical purposes the resistor 17 should have the same scale graduation or division as the display device, for example, a division of 0 to 100, see FIG. 1. If the body 4 to be balanced has, for example, a circumference of 48cm, the resistor 17 would be adjusted to the scale division 48. Thus, the respective indication on the indicator 19 will be at 48 corresponding to an angle of 360°. For example, if the indicator 19 shows a value of 30, it is now possible to ascertain the angular position of the unbalance by starting to count next to the reference marker and to count to number 30 on the tape 6. In the assumed example of a circumference of 48cm, the tape 6 would also have 48 graduation marks and the resistor 17 would be provided with a respective scale. An indication of "30" on the display device 19 would then directly correspond to 30 marking units on the tape 6 and the angular position of the unbalance on the body 4 could directly be ascertained and marked on the body.

The circuit of FIG. 2 could be modified by connecting at the input end of the resistor 15 a voltage which is directly proportional to the unbalance angle $\phi$. Such a voltage could be directly supplied from the unbalance measuring device of the balancing machine in a known manner. Thus, it would be unnecessary to provide for a separate adjustment of the angle by the resistor 13.

Another modification of the circuit of FIG. 2 is possible if the measuring device of the balancing machine itself is provided with adjustment means for the radius or diameter of the body to be balanced at a plane where the balancing is to take place. In such an instance, the potentiometer 17 would be coupled directly with the respective adjustment means in the balancing machine, said coupling being either mechanical or electrical. Thus, it is possible to directly read the respective units at the indicator 19 after adjustment in the balancing machine.

Figure 3:
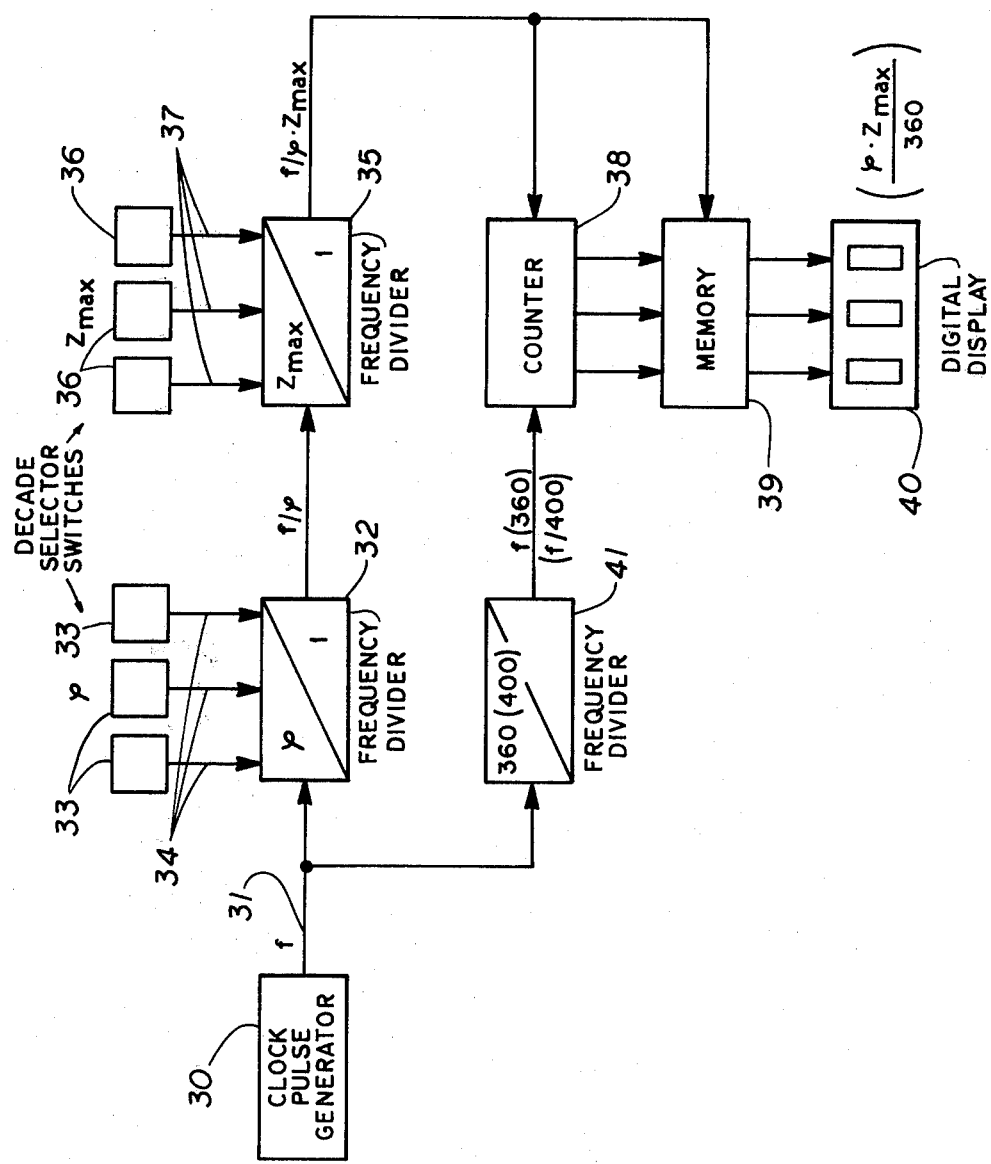
FIG. 3 is a block diagram of a circuit arrangement for an angular indication involving a frequency divider circuit and a digital angle display or indication.

FIG. 3 illustrates an embodiment including a frequency dividing circuit and a digital display of the angle. A clock pulse generator 30 supplies any suitable clock frequency "$f$" to the input 31 of the frequency divider 32. The frequency divider 32 is equipped with decade switches 33 connected to the frequency divider proper through conductors 34. The frequency dividing ratio is adjustable by hand through these decade switches 33 and in accordance with the angular value $\phi$ measured on the balancing machine. The output frequency of the frequency divider 34 has the value $f/\phi$ and is supplied to a similar frequency divider 35, the dividing ratio of which is also adjustable by decade switches 36 connected to the frequency divider 35 by conductors 37. This adjustment with the decade switches 36 is made relative to the maximum circumference $z_{max}$ of the body to be balanced and the units may again be of any desired type. In this connection, the number $z_{max}$ may be the largest number on a tape secured to the body to be balanced or it may be a number of grooves evenly spaced around the circumference of the body.

The output frequency $f/\phi \cdot z_{max}$ of the frequency divider 35 is supplied to the counter 38 and to the memory 39 for the purpose of transferring the count in the counter 38 into the memory 39. Thus, this transfer takes place in accordance with the output frequency of the frequency divider 35. The count stored in the memory 39 is displayed in a digital display 40 in the form of a continuous display calibrated, for example, for 360°.

The clock frequency $f$ is also supplied to the input of a further frequency divider 41 which has a fixed dividing ratio of 360 or 400 (new angular units) (gon). The output frequency of the divider 41 is supplied to the counting input of the counter 38, whereby the latter counts the periods of the frequency $f/360$ or $f/400$ within one period of the frequency $f/\phi \cdot z_{max}$. The resulting count corresponds to the unbalance angle $\phi$ in the selected counting units and is displayed on the digital display 40. This count is ascertained as follows:

$$\text{Count} = \frac{\frac{f}{360}}{\frac{f}{\phi \cdot z_{max}}} \rightarrow \frac{\phi \cdot z_{max}}{360} \text{ or } \frac{\phi \cdot z_{max}}{400}.$$

Thus, it is noted that the clock frequency $f$ is eliminated from the end result which is displayed. The clock frequency $f$ merely determines how often the transformation or conversions take place.

The embodiment of FIG. 3 may be modified by omitting the decade selector switches 33 and supplying the unbalanced angle $\phi$ in digital form directly to the inputs 34 from the frequency divider 32. This feature avoids the adjustment of the decade switches 33.

The apparatus of FIG. 3 may also be used to directly display an unbalance angle in units of length relative to the circumference of a body to be balanced. For this purpose a digital value is supplied to the frequency divider 35 at the inputs 37 thereof. Such digital value corresponds to the radius of the body to be balanced. $\pi$ or to the diameter $\cdot \pi$. The means for providing such a digital value may be directly part of the balancing machine which normally is equipped with such adjustment means for the radius or diameter of the body to be balanced.

Figure 4:
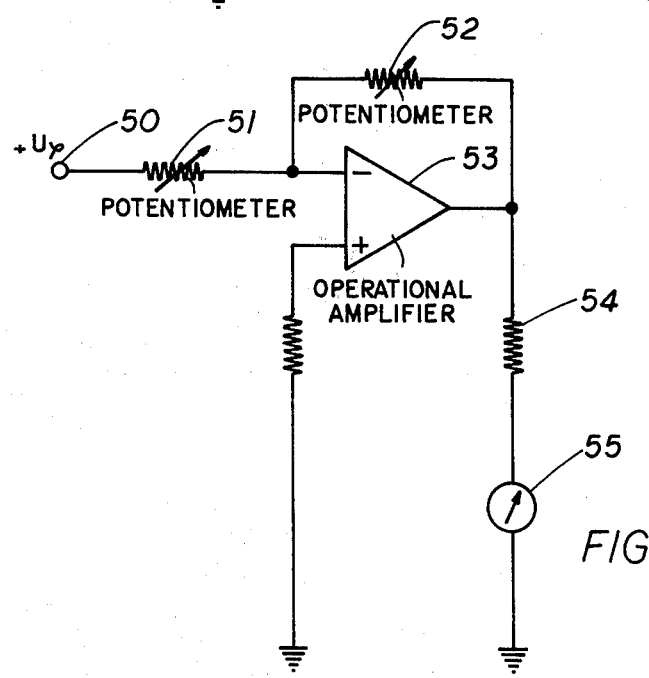
FIG. 4 is a block diagram of a circuit arrangement for an angular display on a machine member which rotates with the body to be balanced.
Figure 6:
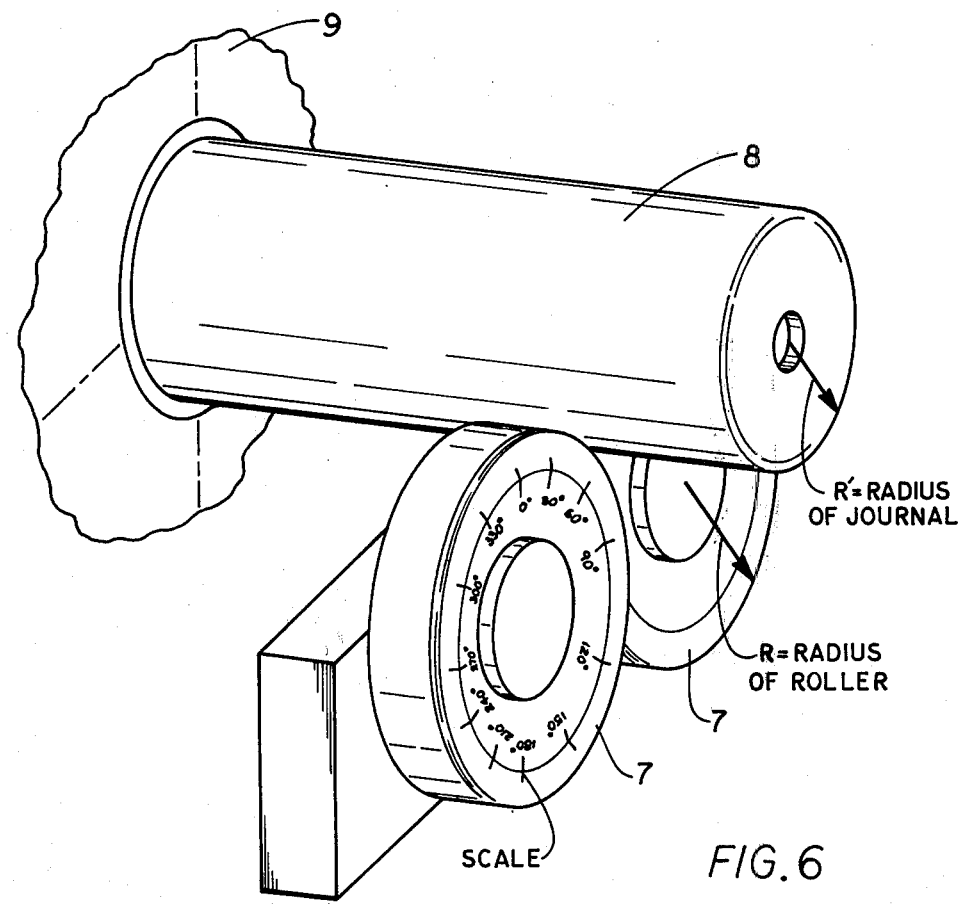
FIG. 6 illustrates the supporting of a rotating body by means of support rollers, whereby only one end of the rotating body is shown.

FIG. 6 shows the support of a body to be balanced by means of carrier rollers 7 on which a journal 8 of the body 9 rests in a rotatable manner. The other end of the body 9 is similarly supported. The support rollers have a radius R and the journal 8 of the body 9 has a radius R'. One of the rollers 7 may be provided with a scale as shown in FIG. 6. In this instance, the unbalance angle may be ascertained with a circuit arrangement as shown in FIG. 4, which is similar to the second stage in FIG. 2. The correlation between an indication of an unbalance angle on the display device 55 and the actual position of the unbalance is given by the fixed ratio between the radius R of the support rollers and the radius R' of the journal 8, whereby it is assumed that there is no slip between the journal 8 and the support rollers 7.

An analog voltage U corresponding to the unbalance angle is ascertained by the measuring device of the balancing machine and is supplied to the input 50 of the circuit shown in FIG. 4. An adjustable series resistor 51 connects the input 50 to one terminal of the operational amplifier 53. The resistor 51 is adjusted to the constant radius R of the support roller. The radius R' of the journal 8 is adjusted with a further potentiometer 52, the operational amplifier 53 multiplies the voltage U with the quotient R'/R. The result of the multiplication is displayed in device 55 connected to the output of the operational amplifier 53 through a series resistor 54.

For transferring the unbalance angle onto the body to be balanced, the body 9 is brought into the zero position. Then the body 9 is rotated until the angular indication on the scale on the roller 7 corresponds to the angular indication on the indicator 55. Where the scale on the roller 7 does not start with zero, the respective starting angular value is added to the reading on the instrument. It is also possible to make the scale on the roller 7 rotatable relative to the roller so that the scale may be returned to zero prior to each adjustment. In this instance it is possible to directly read off from the scale on the roller 7 the value indicated by the instrument 55. Another possibility is to add the starting angle by electric means to the angle displayed by the instrument 55 where the scale on the roller 7 cannot be returned to its zero position.

It is an advantage of the invention that selector switches may be provided for indicating a normal angular display as well as a display in units of length or in non-dimensional units.

Summarizing, the invention provides a generally applicable method for rapidly and precisely ascertaining the angular position of the unbalance which is especially suitable for balancing machines in which the body to be balanced is rotated by means other than a substantially rigid shaft. It is also advantageous to easily store the angular value so that it is readily available for the subsequent balancing operation such as a machining operation. The transfer of the ascertained angular position of the unbalance onto the body to be balanced is easily accomplished by the means described above. The invention is easily adapted to different kinds and sizes of bodies to be balanced and it may be used where the unbalance is referenced to a member rotating with the body rather than to the body itself.

Although the invention has been described with reference to specific example embodiments, it will be appreciated, that it is intended to cover all modifications and equivalents within the scope of the appended claims.

What is claimed is:

1. A method for indicating the angular position of an unbalance in a rotary body to be balanced in a balancing machine, comprising ascertaining the angular position of the unbalance with respect to a reference on the body, in the form of an angular position representing electrical signal, transforming said angular position representing electrical signal to correspond to linear measurement units which are automatically referenced to the circumference of the body to be balanced, whereby these measurement units are transferrable to the circumference of the rotary body, and supplying said transformed and referenced electrical signals to an indicator means for display.

2. The method according to claim 1, further comprising providing said rotary body to be balanced with a graduated scale or division, reading said measurement units from said indicator means, and marking the position of said unbalance on said rotary body in accordance with the reading from the indicator means.

3. The method according to claim 2, further comprising adjusting said indicator means prior to said display to a scale which is related to said circumference of said body to be balanced.

4. The method according to claim 1, wherein said measurement units are units of length referenced to a graduated scale wrappable around the circumference of the body to be balanced.

5. The method according to claim 1, wherein said measurement units are units of arbitrary length.

6. The method according to claim 1, comprising referencing said measurement units to a rotary member that rotates with the body to be balanced.

7. The method according to claim 6, wherein said rotary member is a support roller rotating with the body to be balanced.

8. The method of claim 1, wherein said automatic referencing of the measurement units is accomplished by counting markings on the body to be balanced from a null position to the position of the unbalance.

9. The method of claim 1, wherein said automatic referencing of the measurement units is accomplished by multiplying the measured angular value with a radius of the body to be balanced.

10. In an apparatus for indicating the angular position of an unbalance in a rotary body to be balanced in a balancing machine, which provides an electrical signal representing said angular position, the improvement comprising circuit means for transforming said electrical signal into units corresponding to linear measurement units on the circumference of said rotating body, operant means connected to said circuit means for providing a reference relative to which said transforming takes place; and display means connected to said circuit means for displaying the display units.

11. The apparatus according to claim 10, wherein said display means comprise a scale permitting the display of said angular position in units of lengths.

12. The apparatus according to claim 10, wherein said circuit means comprise multiplier means receiving said angular position representing signal, and wherein said operant means provide a factor representing the radius or diameter of the body to be balanced.

13. The apparatus according to claim 12, wherein said multiplier means are coupled with adjustment means associated with said balancing machine for setting a correction radius.

14. The apparatus according to claim 10, wherin said operant means comprise selector means connected to said circuit means for preselecting the display range of said display means so that the display range corresponds to an angular range of 0° to 360°.

15. The apparatus according to claim 14, wherein said selector means comprise attenuator means.

16. The apparatus according to claim 10, further comprising roller means for supporting the body to be balanced and scale means secured to said roller means.

17. The apparatus according to claim 10, wherein said display means comprise analog display means, and wherein said operant means comprise means for selecting a display from a number of different units.

18. The apparatus according to claim 10, wherein said display means comprise a digital display means.

19. The apparatus according to claim 18, further comprising selecting means connected to said digital display means for preselecting a display range of 360°.

* * * * *